United States Patent [19]
Yamaguchi

[11] Patent Number: 6,033,611
[45] Date of Patent: Mar. 7, 2000

[54] METHOD FOR PREPARING GOLF BALLS USING AN INJECTION MOLD

[75] Inventor: Takehiko Yamaguchi, Chichibu, Japan

[73] Assignee: Bridgestone Sports Co., Ltd., Tokyo, Japan

[21] Appl. No.: 09/042,641

[22] Filed: Mar. 17, 1998

[30] Foreign Application Priority Data

Mar. 19, 1997 [JP] Japan ..................................... 9-085999

[51] Int. Cl.$^7$ .................................................. B29C 45/16
[52] U.S. Cl. .......................... 264/250; 264/274; 264/275; 264/278; 264/279.1; 425/125; 425/129.1; 473/367; 473/368; 473/370
[58] Field of Search ..................................... 264/278, 255, 264/274, 275, 279.1, 273, 250; 473/368, 370, 367; 425/125, 129.1

[56] References Cited

U.S. PATENT DOCUMENTS

| | | | |
|---|---|---|---|
| 2,376,085 | 5/1945 | Radford et al. ............................. | 18/30 |
| 4,203,941 | 5/1980 | Brooker ................................... | 264/274 |
| 4,660,830 | 4/1987 | Tomar ........................................ | 273/60 |
| 4,959,000 | 9/1990 | Giza ......................................... | 425/116 |
| 5,882,567 | 3/1999 | Cavallaro et al. ....................... | 264/255 |

*Primary Examiner*—Jan H. Silbaugh
*Assistant Examiner*—Edmund H. Lee
*Attorney, Agent, or Firm*—Sughrue, Mion, Zinn, Macpeak & Seas, PLLC

[57] ABSTRACT

In preparing a golf ball comprising an inner cover (8) and an outer cover (13) around a core (5), an injection mold is used for the injection molding of the inner cover. The mold has a molding surface defining a cavity (4) and a plurality of opposed support pins (6) adapted to be moved into and out of the cavity with respect to the molding surface. The inner cover is formed by supporting the core in the cavity by means of the support pins, leaving a space between the core and the molding surface, injecting a molding material into the space, and curing the injected molding material while support pins are being projected into the cavity and/or support pins have been withdrawn behind the molding surface, thereby forming around the core the inner cover (8) having recesses (12) and/or protrusions (14).

7 Claims, 6 Drawing Sheets

METHOD FOR PREPARING GOLF BALLS USING AN INJECTION MOLD

BACKGROUND OF THE INVENTION

1. Field of the Invention

This invention relates to a method for preparing golf balls having a multi-layer cover using an injection mold.

2. Prior Art

Golf balls of interest have a core and a cover which consists of inner and outer covers. One prior art injection molding method for forming the inner cover is illustrated in FIGS. 10 and 11. A prior art injection mold 1 is illustrated as comprising a pair of separable upper and lower mold segments 2 and 3 which define a spherical cavity 4 when mated along a parting surface. The mold also includes a plurality of upper and lower support pins 6 and a plurality of gates (not shown) extending along the parting surface or in proximity to the parting surface in the event of tunnel gates. The support pins 6 are received in holes 6a for vertical motion. The mold further includes vertically extending holes 9 and stationary cylindrical pins 10 which are received in the holes 9 to define degassing gaps with the inner surface of the holes 9.

Upon use, a preformed core 5 is placed in the mold cavity as an insert and supported in place by the upper and lower support pins 6 as shown in FIG. 10. A cover stock for the inner cover is injected into the space between the mold cavity 4 and the core 5 through the gates. Immediately before injection of the cover stock or simultaneous with the completion of injection, the support pins 6 are withdrawn so that the distal ends of the support pins 6 become flush with the cavity surface or molding surface 7. In this way, a inner cover 8 is formed around the core 5 as shown in FIG. 11.

Then the molded part is removed from the mold. Using another injection mold of substantially the same construction as above except that the molding surface is provided with a negative dimple pattern. The molded part is supported in place in the mold cavity and a cover stock for the outer cover is injection molded by the same procedure described above. A final molded part or golf ball is obtained in this way. In an alternative procedure, the outer cover is formed by compression molding.

While the outer cover is formed by injection molding or compression molding, a particular combination of the inner and outer cover materials can provide poor adhesion of the outer cover to the inner cover so that the ball becomes less durable. For the purpose of increasing adhesion, the inner cover must be mechanically roughened or chemically treated on the surface. This mechanical roughening or chemical treatment adds one step to the process although the adhesion between the outer cover and inner cover is enhanced thereby.

SUMMARY OF THE INVENTION

Therefore, an object of the invention is to provide a method for preparing a golf ball having a multilayer cover, which can achieve a firm adhesion between the inner cover and the outer cover even when the adhesion is originally poor due to a combination of the inner cover and outer cover materials and which eliminates or significantly simplifies the step of physically roughening or chemically treating the surface of the inner cover for enhancing the adhesion between the inner cover and the outer cover. Another object of the invention is to provide a method for preparing a highly durable golf ball having a multilayer cover.

The invention provides a method for preparing a golf ball comprising an inner cover of at least one layer and an outer cover around a core using an injection mold for the inner cover. The injection mold has a molding surface defining a spherical cavity, a plurality of opposed support pins adapted to be moved into and out of the cavity with respect to the molding surface, and at least one gate for injecting a molding material into the cavity. In a first step, the core is supported in place in the cavity by means of the support pins, leaving a space between the core and the molding surface. A second step is to inject a molding material into the space through the gate. In a third step, the injected molding material is cured while the support pins are being projected into the cavity beyond the molding surface, or after the support pins have been withdrawn behind the molding surface, thereby forming around the core the inner cover having recesses and/or protrusions.

The feature of the invention resides in the step of forming the inner cover of the multilayer cover by injection molding. The injected molding material is cured while the support pins are being projected beyond the molding surface into the cavity or after the support pins have been withdrawn behind the molding surface, thereby forming the inner cover having recesses or protrusions. When the outer cover is then formed around the inner cover, the recesses or protrusions achieve physical biting engagement between the inner cover and the outer cover. A robust bond can be established between the inner cover and the outer cover even though the step of physically roughening or chemically treating the surface of the inner cover is omitted or simplified. As a result, fully durable golf balls can be manufactured.

It might occur to those skilled in the art that the molding surface of the inner cover injection mold is provided with recesses or protrusions. This method is disadvantageous in that an extra step of working the mold becomes necessary and a molded part is often damaged because the particular geometry and position of recesses or protrusions on the mold can obstruct the removal of the molded part from the mold.

BRIEF DESCRIPTION OF THE ACCOMPANYING DRAWINGS

The above and other objects, features and advantages of the invention will be more fully understood by reading the following description, taken in conjunction with the accompanying drawings.

DETAILED DESCRIPTION OF THE INVENTION

Referring to FIGS. 1 to 9, there is illustrated an injection mold according to the invention. Since the outline of the mold is the same as the mold shown in FIGS. 10 and 11, like parts are designated by the same numerals as in FIGS. 10 and 11.

Figure 10:
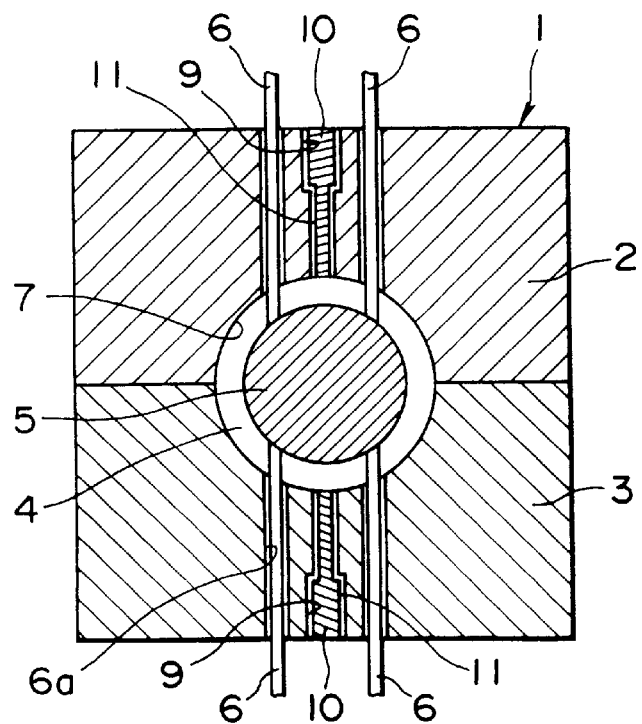
FIGS. 10 and 11 are elevational cross-sectional views of a prior art injection mold for golf balls before and after an inner cover material is injected, respectively.
Figure 11:
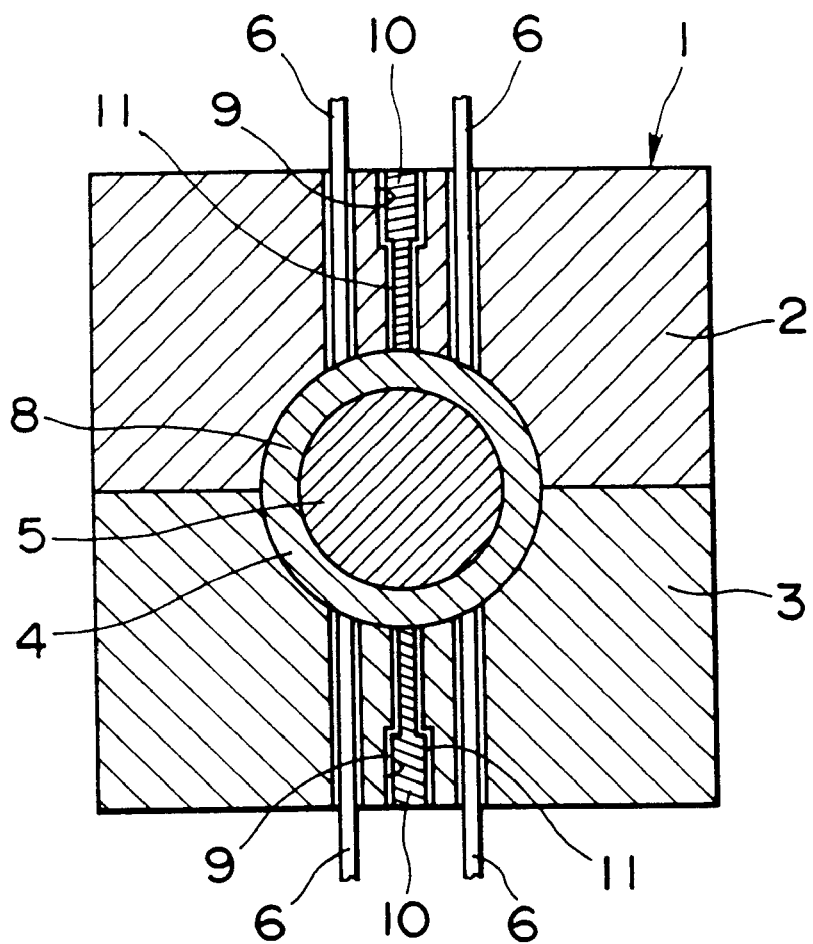

The method for preparing a golf ball having a multilayer cover structure according to the invention mainly pertains to the step of injecting an inner cover molding material as shown in FIG. 10. The inner cover molding material may be based on either a thermoplastic resin or a thermosetting resin. The injected molding material is cured while the support pins are being projected into the cavity, or after the support pins have been withdrawn below the inner surfaces of the mold segments. The inner cover having recesses and/or protrusions is formed around the core.

First Embodiment

Figure 1:
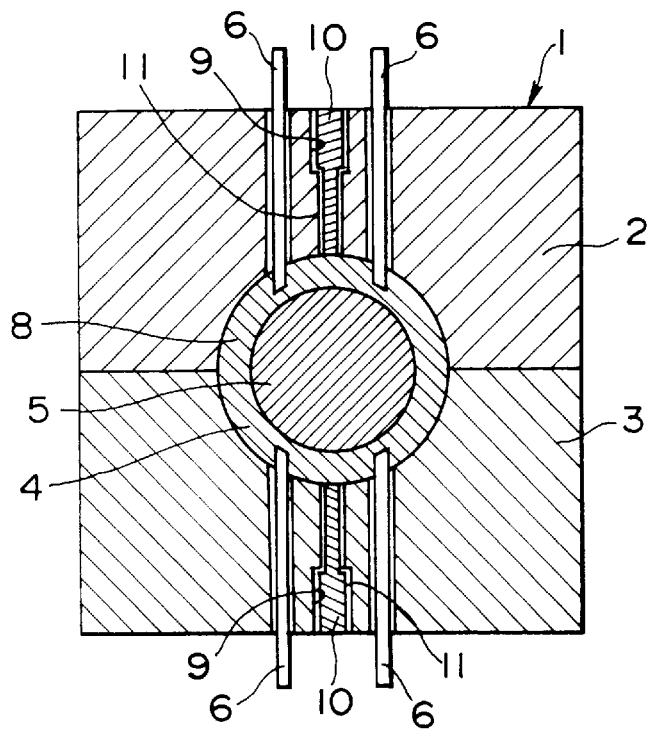
FIG. 1 is an elevational cross-sectional view of an injection mold according to a first embodiment of the invention.
Figure 2:
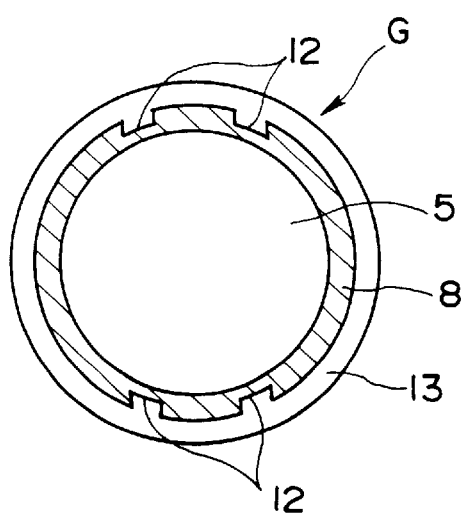
FIG. 2 is a cross-sectional view of a golf ball obtained in the first embodiment.

FIGS. 1 and 2 illustrate a first embodiment of the invention. There are disposed four support pins 6 in each of the upper and lower mold segments 2 and 3. Prior to the injection of the inner cover molding material, the pins 6 support the core 5 in place. After the molding material is injected, the support pins 6 are withdrawn until the distal ends of the pins 6 reach approximately half the thickness of the inner cover 8. With the pins half withdrawn, the molding material is cured.

As a result, the inner cover 8 is molded having a corresponding number of recesses 12 which are located at the positions of the support pins 6 and have a depth corresponding to approximately half the thickness of the inner cover 8 as best shown in FIG. 2.

If an outer cover 13 is formed around the inner cover 8, the molding material of the outer cover 13 enters the recesses 12 in the inner cover 8 and bound and anchored therein. A golf ball G is obtained having a firm joint between the inner and outer covers 8 and 13.

Second Embodiment

Figure 3:
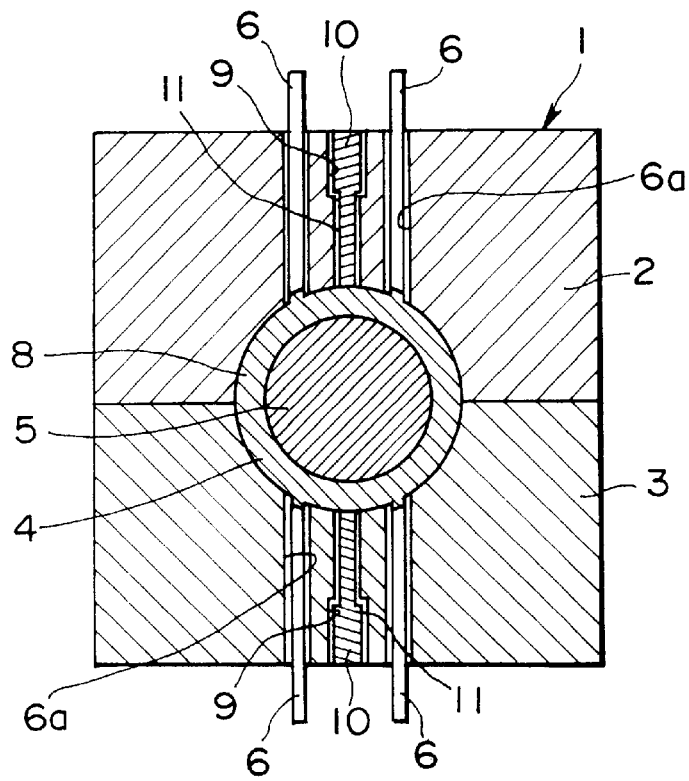
FIG. 3 is an elevational cross-sectional view of an injection mold according to a second embodiment of the invention.
Figure 4:
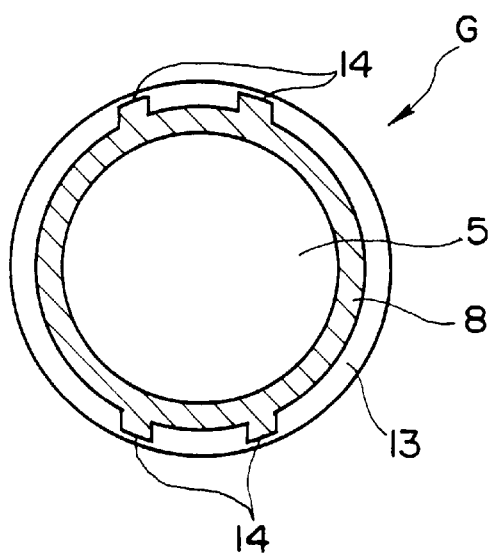
FIG. 4 is a cross-sectional view of a golf ball obtained in the second embodiment.

FIGS. 3 and 4 illustrate a second embodiment of the invention. Prior to the injection of the inner cover molding material, the pins 6 support the core 5 in place. After the molding material is injected, the support pins 6 are withdrawn behind the inner surfaces until the distal ends of the pins 6 are retracted in the holes 6a. Then the molding material flows into the holes 6a. In this state, he molding material is cured.

As a result, the inner cover 8 is molded having protrusions 14 whose number and position correspond to those of the support pins 6 as best shown in FIG. 4.

If an outer cover 13 is formed around the inner cover 8, the protrusions 14 are bound and anchored in the outer cover 13. A golf ball G is obtained having a firm joint between the inner and outer covers 8 and 13.

Third Embodiment

Figure 5:
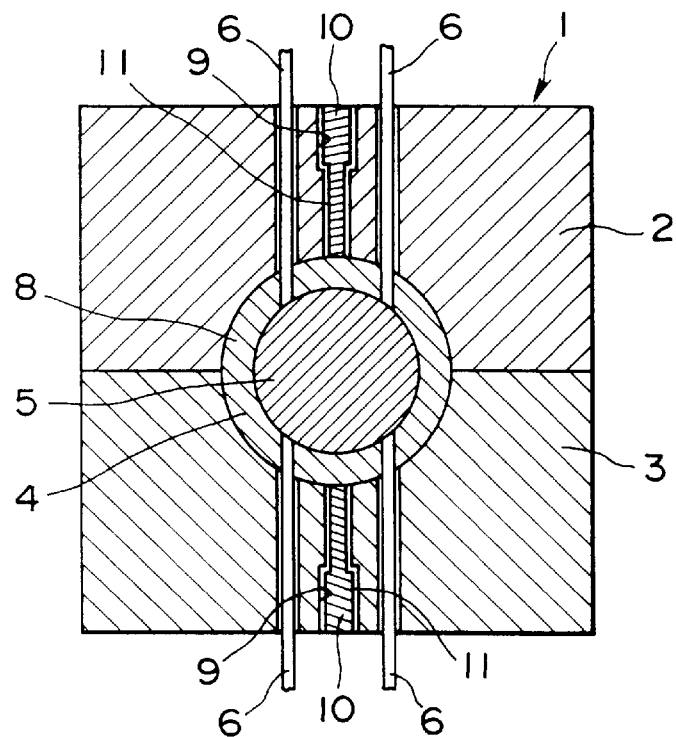
FIG. 5 is an elevational cross-sectional view of an injection mold according to a third embodiment of the invention.
Figure 6:
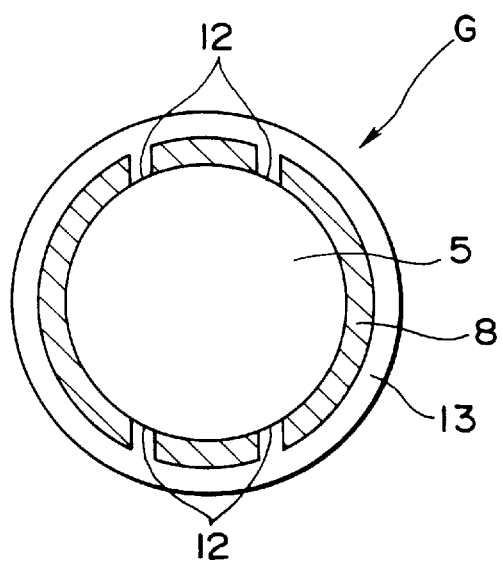
FIG. 6 is a cross-sectional view of a golf ball obtained in the third embodiment.

FIGS. 5 and 6 illustrate a third embodiment of the invention. Prior to the injection of the inner cover molding material, the pins 6 support the core 5 in place. After the molding material is injected, it is cured while the support pins 6 are kept extended to support the core 5.

As a result, the inner cover 8 is molded having a corresponding number of recesses 12 which are located at the positions of the support pins 6 and extend throughout the inner cover 8 as best shown in FIG. 6 (the recesses 12 in FIG. 6 being deeper than the recesses 12 in FIG. 2).

If an outer cover 13 is formed around the inner cover 8, the molding material of the outer cover 13 enters the recesses 12 in the inner cover 8 and bound and anchored therein. A golf ball G is molded having a firm joint between the inner and outer covers 8 and 13.

Fourth Embodiment

Figure 7:
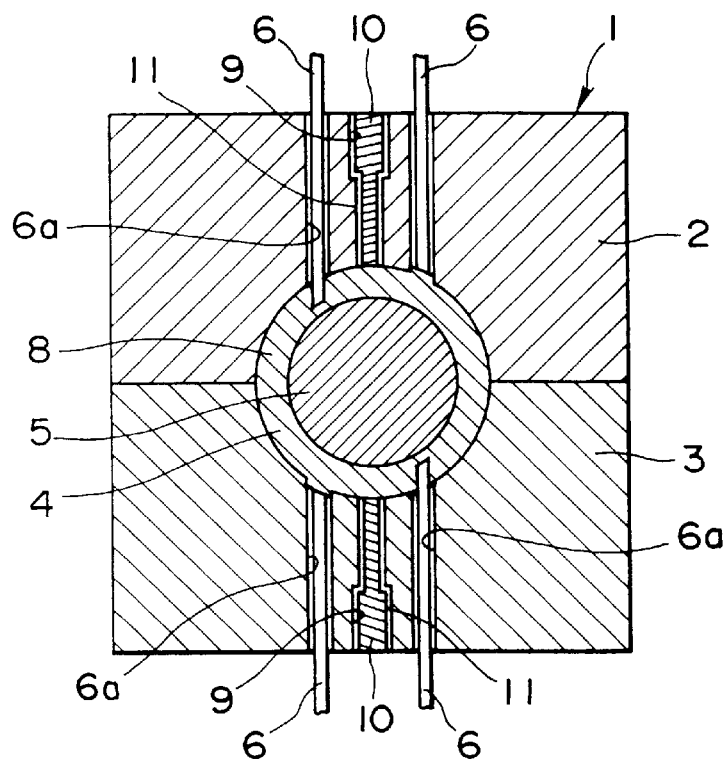
FIG. 7 is an elevational cross-sectional view of an injection mold according to a fourth embodiment of the invention.
Figure 8:
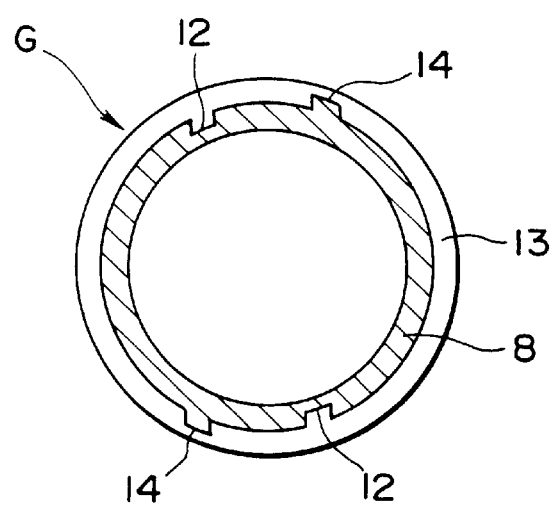
FIG. 8 is a cross-sectional view of a golf ball obtained in the fourth embodiment.

FIGS. 7 and 8 illustrate a fourth embodiment of the invention which is a combination of the first and second embodiments. After the molding material is injected, the support pins 6 are selectively withdrawn. Specifically, the distal ends of some support pins 6 project to approximately one half the thickness of the inner cover 8, and the distal ends of the remaining support pins 6 are retracted behind the molding surface over a distance approximately equal to the projection of the some support pins 6. The retracted pins allow the molding material to flow into the holes 6a. In this state, the molding material is cured.

As a result, the inner cover 8 is molded having recesses 12 and projections 14 as best shown in FIG. 8. This embodiment also ensures that a golf ball G has a firm joint between the inner and outer covers 8 and 13.

Fifth Embodiment

Figure 9:
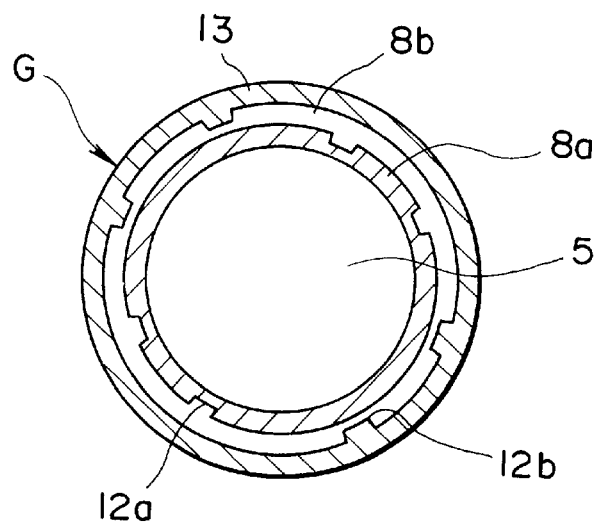
FIG. 9 is a cross-sectional view of a golf ball obtained in a fifth embodiment.

FIG. 9 illustrates a fifth embodiment of the invention. In this embodiment, a first inner cover 8a and a second inner cover 8b having different physical properties (broadly stated, a plurality of inner cover layers) are formed between the core 5 and the outer cover 13. By the same procedure as in the first embodiment, recesses 12a and 12b are formed in the inner covers 8a and 8b, respectively. In the golf ball obtained in this embodiment, both the joint between the first and second inner covers 8a and 8b and the joint between the second inner cover 8b and the outer cover 13 are robust.

In the foregoing embodiments, the cross-sectional area of support pins that form recesses or protrusions, the distance of projection or retraction (height or depth) of support pins with respect to the cavity surface at the end of molding, the number of support pins, and the location of support pins may be properly selected. For molding efficiency and for effectively achieving the objects of the invention, it is desirable that support pins have a cross-sectional area of 3 to 30 mm$^2$, especially 7 to 20 mm$^2$, the distance of projection or retraction of support pins with respect to the cavity surface is 0.3 to 5 mm, especially 1 to 2 mm, and the number of support pins per mold segment is 3 to 10, especially 3 to 6.

In the practice of the invention, the core may be either a solid core or a wound core. Then either solid golf balls of the multilayer cover structure or wound golf balls of the multilayer cover structure can be produced.

According to the inventive method for preparing golf balls having an inner cover and an outer cover around a core, a robust joint can be established between the inner cover and the outer cover without resorting to the step of physically roughening or chemically treating the surface of the inner cover. Even though the roughening or surface treating step is omitted or simplified, fully durable golf balls can be manufactured.

Although some preferred embodiments have been described, many modifications and variations may be made thereto in the light of the above teachings. It is therefore to be understood that within the scope of the appended claims, the invention may be practiced otherwise than as specifically described.

I claim:

1. A method for preparing a golf ball having an inner cover around a core and an outer cover, said inner cover being prepared by using an injection mold for the inner cover, the injection mold comprising a pair of separable upper and lower mold segments which define a spherical cavity when mated along a parting surface, 3 to 10 support pins in each of the mold segments to be moved into the cavity with respect to a molding surface, and at least one gate for injecting a molding material into the cavity, wherein said support pins have cross-sectional area of 7 to 20 mm$^2$, said method comprising the steps of:

supporting the core in place in the cavity by means of the support pins moved into the cavity, while leaving a space between the core and the molding surface;

injecting a molding material into the space through the at least one gate;

withdrawing the support pins until the distal ends of said pins reach approximately one half the thickness of the space between the core and the molding surface;

curing the injected molding material while the support pins are withdrawn thereby forming around the core an inner cover having recesses which have a depth corresponding to approximately one half the thickness of the inner cover; and subsequently molding said outer cover over said inner cover wherein material forming said outer cover enters the recesses to form a firm joint between said outer cover and said inner cover.

2. The method for preparing a golf ball according to claim 1, wherein the support pins are moved into the cavity a distance in the range of 1 to 2 mm.

3. The method for preparing a golf ball according to claim 1, wherein the support pins are moved into the cavity a distance in the range of 0.3 to 5.0 mm.

4. The method for preparing a golf ball according to claim 1, wherein the number of upper and lower support pins is in the range of 3 to 6 mm.

5. A method for preparing a golf ball having an inner cover around a core and an outer cover, said inner cover being prepared by using an injection mold for the inner cover, the injection mold comprising a pair of separable upper and lower mold segment which define a spherical cavity when mated along a parting segment, 3 to 10 support pins in each of the mold segments to be moved into the cavity with respect to a molding surface, and at least one gate for injecting a molding material into a cavity, wherein said support pins have cross-sectional area of 7 to 20 mm$^2$, said method comprising the steps of:

supporting the core in place in the cavity by means of the support pins moved into the cavity, while leaving a space between the core and the molding surface;

injecting a molding material into the space through the at least one gate;

selectively withdrawing some of the support pins until the distal ends of the some support pins project from the molding surface, and withdrawing the remaining support pins until the distal ends of the remaining support pins are behind the molding surface;

curing the injected molding material while the support pins are withdrawn, thereby forming around the core the inner cover having recesses and projections, wherein the recesses of the inner cover having a depth corresponding to the projection of the some support pins from the molding surface, and the projections of the inner cover having a height corresponding to the extent of withdrawal of the remaining support pins behind the molding surface; and subsequently molding said outer cover over said inner cover wherein material forming said outer cover enters the recesses of the inner cover and around the projections of the inner cover to form a firm joint between said outer cover and said inner cover.

6. The method for preparing a golf ball according to claim 5, wherein said support pins are retracted a distance corresponding to the projection distance of the pins to form said inner cover.

7. The method for preparing a golf ball according to claim 5, wherein said support pins are retracted approximately one half the thickness of said inner cover layer.

* * * * *